July 19, 1938.   J. P. LAVIGNE   2,124,252

MEANS FOR SECURING MOLDING OR THE LIKE

Filed March 25, 1936

INVENTOR
Joseph P. Lavigne.
BY Harness, Dickey, Pierce & Hann.
ATTORNEYS.

Patented July 19, 1938

2,124,252

UNITED STATES PATENT OFFICE 2,124,252

MEANS FOR SECURING MOLDING OR THE LIKE

Joseph P. Lavigne, Detroit, Mich., assignor to George E. Gagnier and Bion C. Place, both of Detroit, Mich.

Application March 25, 1936, Serial No. 70,746

8 Claims. (Cl. 189—88)

This invention relates in general to means for securing molding or similar strips to a support, and in particular it relates to securing a molding or similar strip to an automobile body.

Among the objects of this invention are to provide a means for connecting a molding or similar strip to a support which will prevent movement of the molding relative to the support; to provide a fastener of such a construction that it will not become displaced from its proper position in the molding; to provide a fastener constructed from a single piece of wire in such a way that additional elements are not necessary to prevent movement of the parts with which the fastener is used; to provide a securing means for molding that is simple in construction, economical in manufacture and efficient in use; and to provide a molding, support and fastener of such construction that they may be readily, easily and economically assembled.

Other objects of the invention will be apparent to those skilled in the art from the accompanying drawing and following description relative thereto.

In the drawing, in which like numerals are used to designate like parts in the several different views, Figure 1 is a fragmentary side elevational view of one embodiment of the invention, showing molding, support and securing means in assembled relation;

Figure 1:
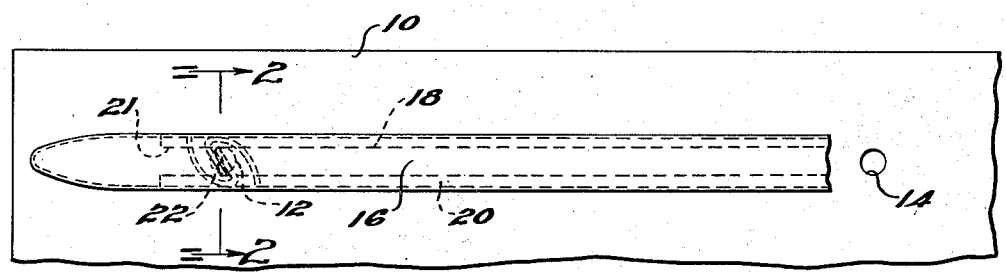
Figure 5:
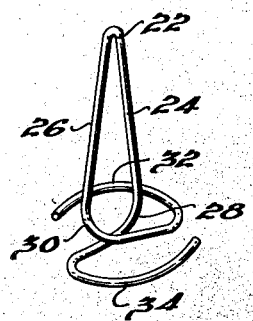
Fig. 5 is a perspective view of the securing means illustrated in the previous figures.
Figure 2:
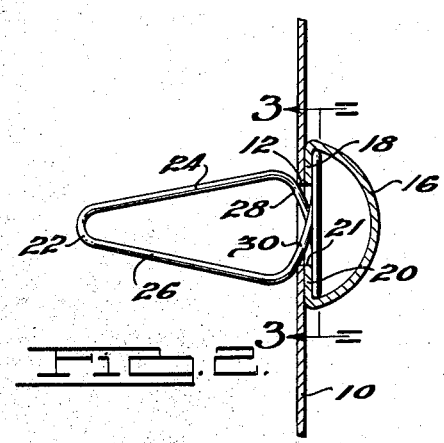
Fig. 2 is an enlarged vertical sectional view taken along line 2—2 of Fig. 1, the securing means being shown in full side elevation.

It is recognized that the use of molding, or ornamental strips, and other similar constructions in automobiles and other articles of manufacture, is well known. Such moldings are generally hollow and channel shaped in section and are mounted with the open side of the channel adjacent the support. Various means have been used for fastening the molding in place on the support; and one well known means that has been employed is the so-called hairpin element that is connected to the molding and which has resilient prongs adapted to pass through openings in the support, or other member, to which the molding is applied and thereafter resiliently to hold the molding to the support. One disadvantage of this type of fastening means is that the fastening means are not adequately secured to molding, and movement of the molding along its length relative to the fastening means is permitted. In such old construction, the free ends of the wire which forms the hairpin element form the prongs which pass through the opening in the support.

In the present invention, the head of the securing means is formed of the free ends bent into curved arms which have a greater overall lateral dimension measured in any direction in the plane of the head than the width of the channel of the molding so that when introduced into the molding, they must be compressed and are therefore confined under tension in the molding and also resist displacement therein. This accomplishes a function not possible with the prior types of hairpin fasteners; and is much simpler and more economical to manufacture than other old types of fasteners in which additional, separate elements are needed on the fastening means to prevent relative movement between the securing means and the molding. In the preferred form of the invention the free ends of the wire hairpin element are formed in a head which is placed within the inside surface of the molding in such a relation that the free ends bear against the sides of the molding and also resist normal displacement therein.

In the present invention, a fastening means is provided, made of a single wire and formed with a shank portion and a head portion, the free ends of the wire lying in the plane of the head portion, which is substantially perpendicular to the plane of the shank portion. The head portion is formed with curved arms which are of a greater overall lateral dimension measured in any direction in their plane than the width of the inside of the channel-shaped molding so that when the fasteners are introduced into the molding, they must be compressed and are therefore confined under tension in the molding and exert a force against the inner sides of the molding transversely of the head. When the fasteners are inserted in the molding, the free ends of the fasteners contact the side walls of the channel and are of a hard material so that in the preferred embodiment they tend to dig into the walls of the molding to resist normal displacement therein, as above stated. This permits the fasteners to be assembled in a strip of molding and insures them against slipping during and before application to the support.

The molding is assembled with the support by inserting the shanks of the fasteners through openings at spaced intervals in the support, shoulders on the shanks bearing against the edges of the openings to pull the molding toward the support. A secure mounting is provided and one in which the molding will not be shaken loose by continued vibration in use.

For a better understanding of the invention, reference may be had to the drawing in which a support 10 is provided with openings 12 and 14 at spaced intervals along the length of the support, which are adapted to receive fastening means, as will hereinafter be more fully described. Only two openings are shown in the drawing, but, of course, it will be understood that any desired number of such openings may be provided in order to accommodate a molding of the desired length. A molding, or the like, 16, which, in the illustration shown, is channel-shaped, is bent inwardly, as indicated at 18 and 20, at its lower edges, along its length to form shoulders which are adapted to provide seats for the head portions of the fasteners on the inside and to fit against the support 10 on the outside when the parts are in assembled relation. The width of the slot 21 formed by the inwardly bent shoulders is substantially the same as the diameter of the openings 12 and 14 in the support and is adapted to overlie these openings for securing the molding to the support.

In order to tightly hold the molding, or the like, to the support, securing means in the form of hairpin fasteners 22 are provided, each of which has a shank portion and a head portion, the head portion being adapted to lie within the channel shaped molding and the shank portion being adapted to extend out through the slot 21 in the molding and through the openings in the support to securely hold the molding in place when the parts are in assembled relation.

The fastener 22 is formed from a single piece of wire by bending it midway its ends to form legs 24 and 26 which taper slightly away from each other for a distance, then are bent toward each other to form shoulders 28 and 30, and then are crossed and bent into a plane substantially perpendicular to the plane of the legs and in that plane are looped in opposite directions to form curved arms which are substantially semi-circles with the free ends of the wire lying in the plane of the head.

Figure 3:
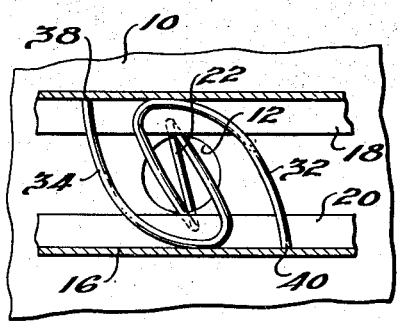
Fig. 3 is a fragmentary, sectional view, taken along line 3—3 of Fig. 2.
Figure 4:
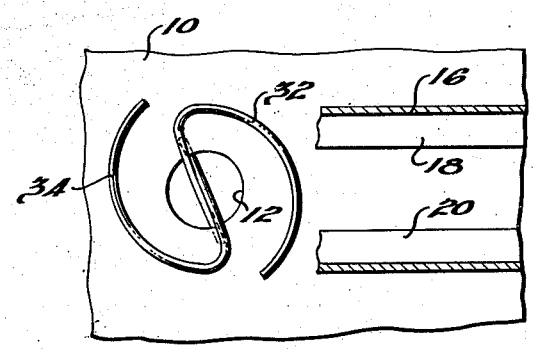
Fig. 4 is a view similar to Fig. 3, with a part of the molding removed and showing the securing means in expanded condition.

As best shown in Figure 4, in which a part of the molding has been removed, the curved arms 32 and 34 are of a greater overall lateral dimension, measured in any direction in their plane, than the width of the inner side of the molding. The fasteners are introduced into the molding by first compressing them and then when they are released in the molding, they will be confined therein under tension, as indicated in Figure 3. As also shown in Figure 3, the free ends of the fasteners when inserted in the molding contact the side walls of the channel therein, as indicated at 38 and 40, and bear against the walls of the molding to prevent displacement of the molding relative to the fastener, as before stated. It will be seen then that a force is exerted by the fasteners against the sides of the molding adjacent their junctures with the edges 18 and 20 transversely of the plane in which the head of the fastener lies and movement of the fastener along the length of the molding is resisted. The under sides of the fastener heads seat on the inturned edges 18 and 20 of the molding with the shanks projecting through the slot 21, and displacement of the fastener through the slot is prevented.

This proper securing of the fastener within the molding is important in assembling the molding to the support since the fasteners can be placed in proper positions in the molding corresponding to the openings in the support to which the molding is to be applied and will not become displaced along the length of the molding, either before or after assembly.

The fasteners which are first placed in the molding are attached to the support by inserting the legs 24 and 26 which form the shank portions through the openings such as 12 and 14 in the supports. When the shank portions have been fully inserted through the openings provided for them in the support, the beveled shoulders 28 and 30 engage the inner marginal edges of the openings and pull the molding tightly up against the panel. This prevents displacement of the molding outwardly from the support; and since displacement of the molding along its length is prevented by the relation of the fastener head to the molding, it can be seen that the molding will be held in its proper position under the jarring and vibration to which it will be subjected in use.

Formal changes may be made in the specific embodiment of the invention described without departing from the spirit and substance of the invention, the scope of which is commensurate with the appended claims.

What is claimed is:

1. In combination, a support with an aperture therein, a channel shaped molding or the like, and means securing the support and molding together, said securing means having a head portion and a shank portion, said head portion being in a plane substantially perpendicular to the plane of the shank portion and being formed of wire members being crossed and bent into curved arms, the arrangement being such that the head portion seats within the channel-shaped molding and exerts a force transversely of the said head against the inner sides of the molding and the shank portion extends through said aperture in said support.

2. In combination, a support, a channel-shaped molding, or the like, and a one-piece wire fastener, securing the support and molding together, said fastener being bent intermediate its ends to form a shank portion, the free ends of said wire then being crossed and bent in curved arms to form a head portion, said head portion being in a plane substantially perpendicular to the plane of the shank portion with the free ends of the wire fastener being in the plane of said head and resiliently bearing against the inner sides of said channel-shaped molding to prevent relative movement between said fasteners and said molding, and said shank portion being attached to said support.

3. A one-piece wire fastener for securing molding or the like to a support comprising a wire bent midway its ends to form legs which taper slightly away from each other for a distance and then are bent towards each other to cross and are then bent into a plane substantially perpendicular to the plane of the legs and in that plane are looped in opposite directions to form substantially semi-circles with the free ends of the wire lying in the plane which is substantially perpendicular to the plane of the legs.

4. In combination, a support, a channel-shaped molding, or the like, and a one-piece wire fastener, securing the support and molding together, said fastener being bent intermediate its ends to form a shank portion, the free ends of said wire then being crossed and bent in curved arms to form a head portion, said curved arms being in a plane substantially perpendicular to the plane of the shank portion and each extending from one inner side of the molding to the opposite inner side with the free ends of the wire fastener resiliently each bearing against an inner side of said channel-shaped molding to prevent relative movement between said fasteners and said molding, and said shank portion being attached to said support.

5. A one-piece wire fastener for securing molding or the like to a support, comprising a wire bent midway its ends to form a shank portion, the free ends of said wire then being crossed and bent in opposite directions in two curved arms disposed in a plane perpendicular to the plane of the said shank portion, said arms each terminating at a point substantially spaced from the other arm and in said plane.

6. In combination, a support having an opening, a channel-shaped molding having inturned flanges on said support over said opening, and a one-piece wire fastener securing the support and molding together, said fastener being bent intermediate its ends to form a shank portion consisting of two legs which gradually diverge from the end of the shank toward the molding, the free ends of said wire being then bent sharply toward each other on straight lines extending from the corner of said opening at inner surface of said support to the inner surfaces of the flanges of said molding, said ends being then bent into curved arms to form a head portion disposed in a plane perpendicular to the plane of said shank portion and each of said curved arms extending from one inner side of the molding to the opposite inner side with the free ends of the wire resiliently each bearing against an inner side of said channel shaped molding to prevent relative movement between said fastener and said molding.

7. In combination, a support having an opening, a channel-shaped molding having inturned flanges on said support over said opening, and a one-piece wire fastener securing the support and molding together, said fastener being bent intermediate its ends to form a shank portion consisting of two legs which gradually diverge from the end of the shank toward the molding, the free ends of said wire being then bent sharply toward each other on straight lines extending from the corner of said opening at inner surface of said support to the inner surfaces of the flanges of said molding, said ends contacting inner opposite walls of said molding so as to prevent free movement of legs of the shank toward each other whereby the shank of the fastener is stiffened and relative movement between the molding and fastener avoided.

8. A one-piece wire fastener for securing a molding or the like to a support, comprising a wire bent midway its ends to form a shank portion of U-form with the legs of the U gradually diverging, the free ends of said wire then being bent sharply inwardly on straight lines and crossed and then bent to form two curved arms disposed in a plane perpendicular to the plane of said shank.

JOSEPH P. LAVIGNE.